United States Patent [19]

Burns

[11] Patent Number: 4,976,518

[45] Date of Patent: Dec. 11, 1990

[54] FIBER OPTIC TRANSVERSAL FILTER/VARIABLE DELAY LINE

[75] Inventor: William K. Burns, Alexandria, Va.

[73] Assignee: The United States of America as represented by the Secretary of the Navy, Washington, D.C.

[21] Appl. No.: 406,440

[22] Filed: Sep. 13, 1989

[51] Int. Cl.$^5$ .......................... G02B 6/26; G02B 6/42; G02F 1/00; G02F 2/00
[52] U.S. Cl. .............................. 350/96.16; 350/96.15; 455/610
[58] Field of Search .......................... 350/96.13–96.14, 350/96.15, 96.16; 455/607–612

[56] References Cited

U.S. PATENT DOCUMENTS 4,890,893  1/1990  Smoot .............................. 455/610 X
4,900,115  2/1990  Heuring et al. .................. 455/610 X
4,934,777  6/1990  Joue et al. ........................ 350/96.15

Primary Examiner—Akm Ullah
Attorney, Agent, or Firm—Thomas E. McDonnel

[57] ABSTRACT

An optical transversal filter comprises a plurality of optically power splitting devices, e.g., 3×3 single mode optical couplers, interspersed with fiber optical delay segments. In a n-column system the number of optical couplers in each column is given by the progression, 1,3,9 ... $3^{(n-1)}$ and only two different lengths of the fiberoptic delay segments are required. Fiber optic delay segments of the appropriate delays are connected to the three outputs of each of the composite such that the fiber optic delay segments connected to the last column provide $3^n$ taps. The outputs can be combined in a single fiber and multiple inputs can be used. Variable weight output taps are provided by connecting each output to an optical intensity modulator or switch.

14 Claims, 5 Drawing Sheets

FIBER OPTIC TRANSVERSAL FILTER/VARIABLE DELAY LINE

FIELD OF THE INVENTION

The present invention relates to transversal filters and, more particularly, to optical transversal filters which are capable of operation in the GHz range and which also provide a large number of taps. The invention also relates to a variable fiber optic delay line.

BACKGROUND OF THE INVENTION

There is considerable interest in the development of transversal filters for use in the GHz range for radar and electronic signal processing applications. Non-optical prior art techniques, such as those involving the use of surface acoustic waves, are generally unsuitable for use in this frequency range. Fiber optic techniques have been developed which provide up to 15 taps in the 2-400 MHz range and such techniques are described, for example, in Chang, et al, "Fiber Optic Delay Line for RF Signal Processing", *Electron. Lett.* 13,678(1977) which discusses the theory of transversal filters; and in Taylor, "Novel Application of Fiber Optics", *Plenum* (1979) and Newton et al "Single Mode Fiber 1×N Directional Coupler", *Opt. Lett.* 8,60 (1983), which are discussed below. In addition, a fiber optic delay line filter of interest is disclosed in U.S. Pat. No. 4,128,759 (Hunt et al), which is also referred to below.

In general, two techniques using optical filters are of interest. In accordance with the first, optical delays have been obtained by employing a bundle of multimode fibers of fifteen different lengths wherein the end of a bundle is excited with an rf modulated optical signal to simultaneously excite the fibers making up the bundle. An injection laser or light emitting diode modulated by a driver receiving an rf input signal can be used to provide the optical input signal and the outputs of the fibers of the bundle are simultaneously imaged on a single photodetector. This approach is disclosed in the Taylor reference referred to above as well as in the Hunt et al patent. Among others, this approach suffers the disadvantage that because the ends of the fibers of the bundle are illuminated, a large fraction of the light falls on the fiber cladding or in the space between the fibers.

In the second approach, disclosed the Newton et al reference, a 1×N directional coupler, which includes an N-fiber output terminal array, is mated with a corresponding tap array on a continuous fiber coil comprising N loops of fiber to achieve coupling. In an example, a single 1×7 tapped delay line provides uniform coupling coefficients with 0.1-0.2 dB excess loss per tap. The disclosed device is a serial device proposed for use as transversal filter, and, although there is no discussion in the Newton et al reference of any extension of this approach to a large number of taps, a problem with such an extension of the basic approach is that, with a serial device, the excess tap losses (i.e., the losses in excess of the useful tap outputs) accumulate as the signal propagates down the line and thus the power at any one tap is affected by all tap losses at preceding taps. Thus, assuming a 0.1 dB loss per tap and 100 taps, the final tap would be 10 dB below the initial taps, thereby making it difficult to produce an array of equal strength signals.

SUMMARY OF THE INVENTION

In accordance with the invention, an optical transversal filter is provided in which the delays are provided in parallel and thus which, in this sense, is an improvement in the optical delay line filters disclosed in the Chang et al and Taylor references and the Hunt et al patent. Generally speaking, the invention involves the use of optical power splitting interspersed with delay in order to reduce the complexity of manufacture of the delay lengths (fiber optic delay line segments) for a large number of taps and to reduce the total length of the fiber required to achieve the desired delays. The invention represents a practical approach to GHz operation with at least 81 taps, and advantages of the invention include the low insertion loss of the components ($<0.5$ dB) in addition to the abovementioned reduction in the complexity of the making of the delay sections and reduction in the total required fiber length. Compared to a serially tapped delay line such as described above, the parallel paths provided by the transversal filter of the invention greatly reduce the length errors and insertion losses that are experienced by each path, which is, of course, a major advantage. Further, all of the transmitted light is used in recombination of the final stage, except for that lost to excess losses in the couplers and splices. In contrast, with serially tapped devices, the power in the line must be maintained nearly constant in order to keep the tap fraction constant while the present invention provides equal tap powers while using all of the input optical power.

In accordance with the invention, an optical transversal filter is provided which comprises input coupler means, comprising an optical power splitter, for receiving at least one optical input signal and providing a plurality of parallel outputs; further coupler means comprising a like plurality of said optical power splitters each providing a further plurality of outputs; intermediate fiber optic delay segments of at least two different lengths for coupling individual ones of the plurality of parallel outputs of said input coupler means to respective ones of said plurality of optical power splitters, and further fiber optic delay segments of at least two different lengths individually connected to the respective outputs of said plurality of optical power splitters such that different delays are provided at the outputs of said further fiber optic delay segments. Preferably, the optical power splitters comprise conventional 3×3 single mode optical coupler providing three outputs.

In a generic embodiment, the filter includes n columns of the coupler means, there are only two different fiber optic delay segments for each column, and the fiber optic delay segments are connected to the outputs of the coupler means and interspersed with the columns of coupler means such that the outputs of fiber optic delay segments connected to the last column provide $3^n$ taps wherein n is, as stated, the number of columns of coupler means (e.g., 3×3 fiber couplers).

In another embodiment, the outputs of the further fiber optic delay segments are coupled through power combiner means to combine the optical outputs, and the output of the filter comprises a single optical fiber which carries the combined optical outputs.

In accordance with a further embodiment, the filter is adapted to receive multiple inputs, and the input coupler means comprises a multiple input coupler device. In a specific example, the multiple input coupler device comprises a 9×9 star input device.

According to another embodiment, an optical intensity control means is connected to the output of one, several, or all of the further optical fiber delay segments, for controlling the intensity of the optical signal at said output, the optical intensity control means preferably comprising an optical modulator or an optical switch. The use of optical modulators provides the capability of having variable tap weights or variable length fiber delay lines.

Other features and advantages of the invention will be set forth in, or apparent from, the detailed description of preferred embodiments of the invention which follows.

DESCRIPTION OF THE PREFERRED EMBODIMENTS

Figure 1:
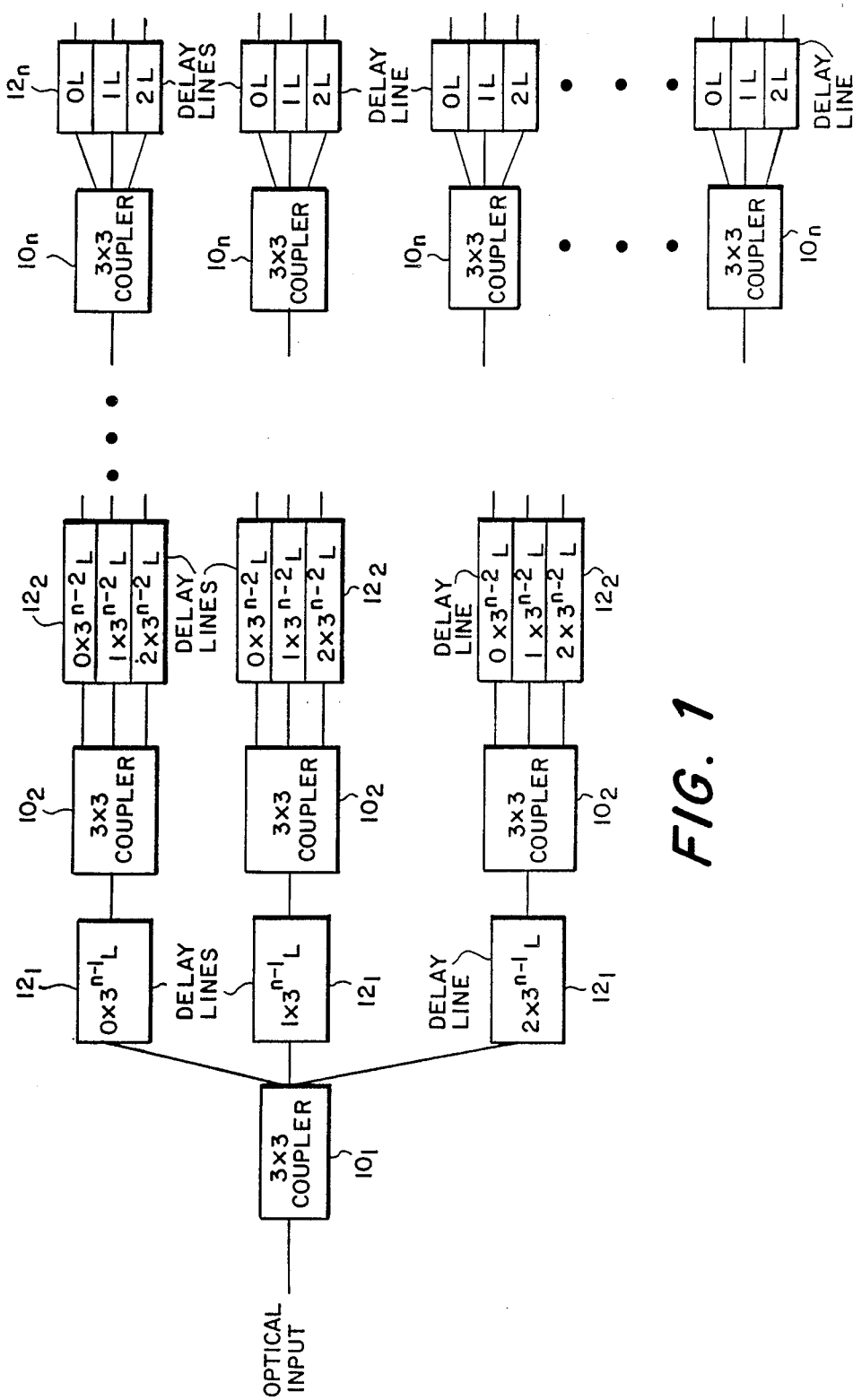
FIG. 1 is a schematic block diagram of a generic n-column embodiment of an optical transversal filter in accordance with the invention.

Referring to FIG. 1, there is shown a generic n-column embodiment of the optical delay line filter of the invention. As illustrated, the optical input which, as noted above in connection with the discussion of the prior art, may comprise the r.f. modulated optical signal output of a laser or light emitting diode, is coupled to a single mode 3×3 optical coupler 10, to provide optical power splitting. It will be understood that 3×3 single mode couplers are conventional coupling devices having three input fibers and three output fibers and reference is made, for example, to Wang et al, "9×9 Fiber Optic Star Coupler", for a general description. It is noted that 3×3 single mode couplers are used in a preferred embodiment because three fibers is the largest number of fibers with which a single mode coupler can be made in a single unit. However, 2×2 couplers could also be employed. Single mode fiber is used in a preferred embodiment because single mode fiber can carry signals modulated at high frequency without modal dispersion and degradation of the frequency response. However, it should be understood that for short delays this may not be a problem and multimode fiber could be used in the same configuration. In such circumstances, couplers of any N×N configuration can be used (N≦100).

It is also noted that, in FIG. 1, the optical couplers are generally denoted 10 with a subscript indicating the column in which the optical coupler is located, and the delay line segments, which are described below, are generally denoted 12 with a subscript indicating the column.

The first coupler column, containing a single coupler $10_1$, is connected through three optical delay line segments $20_1$, which provide delays of $0 \times 3^{n-1}L$, $1 \times 3^{n-1}L$, and $2 \times 3^{n-1}L$, respectively, to a second column of 3×3 couplers, denoted $10_2$, wherein n is the number of columns and L is a constant length corresponding to the delay time between output taps, L being chosen based on the desired center frequency of the filter. As shown, the outputs of these further couplers $10_2$ are connected to nine delay lines $20_2$ which provide the delays indicated. As is indicated in the drawings, there may be a number of intermediate stages, and the final, nth stage comprises $3^{n-1}$ 3×3 couplers $10_n$ and $3(3^{n-1})$ output delay line segments $12_n$. Accordingly, for a system wherein n=4, there are twenty-seven 3×3 output couplers $10_n$ each connected to three output delay line segments whose outputs provide a total of eighty-one output taps.

Figure 2:
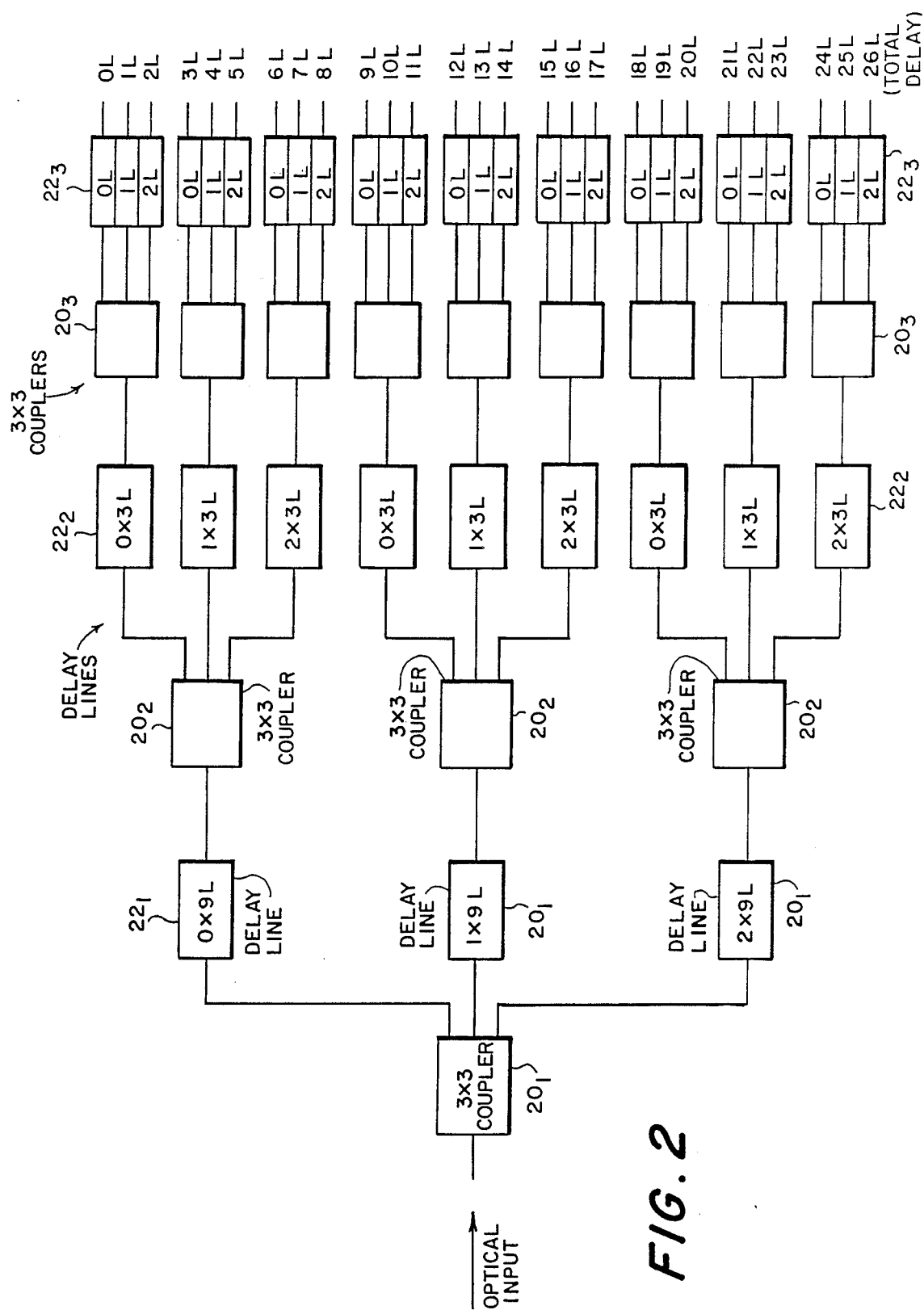
FIG. 2 is a schematic block diagram of a three-column optical transversal filter providing twenty-seven taps.

For purposes of further illustration, an embodiment wherein n=3 is shown in FIG. 2. In common with the generic embodiment of FIG. 1, the optical transversal filter of FIG. 2 comprises an input 3×3 coupler $20_1$ connected to three separate delay line segments 22 which provide the delays indicated for each output optical fiber of the corresponding 3×3 coupler (multiplied by a constant L, which, as noted above, is characteristic of the filter frequency). The outputs of the delay fibers $20_1$ are connected to three 3×3 couplers $20_2$ which are connected through nine delay line segments (fibers) $22_2$ to nine 3×3 couplers $20_3$. The latter are connected to twenty-seven delay line segments $22_3$, the outputs of which constitute twenty-seven taps and which provide the progressive delays indicated in FIG. 2 in the right hand column for the individual taps (delay line outputs).

It is important to note that for each column there are only two different fiber lengths required so that the total number of different optical fiber delay segments or lines is just 2n. This can be seen clearly from the embodiment illustrated in FIG. 2, wherein there are three columns and the number of different lengths is two times three or six (viz., 1,2,3,6,9 and 18). If n=4, the number of taps is $3^n = 3^4 = 81$ (0, 1, 2, 3 . . . 80) but the number of different fiber lengths that must be prepared is only 2n=2(4)=8. It is assumed that 3×3 coupler leads are prepared so as to be the same length so that the delay provided by each coupler is the same for all couplers in a given column. It will be understood that if a 1×N splitter were provided first and the delay segments added to the output of the splitter, N different delays would be needed, so that where 81 taps were to be provided (as in the example above where n=4), 81 different delay lengths would be needed.

The rf frequency at which a transversal filter can be used depends on the accuracy with which the leads of the 3×3 couplers and the fiber delay sections can be cut. The resonance frequency f is related to the delay difference between adjacent paths L by the formula:

$$f = \frac{c}{n_g L}$$

where
$n_g$=optical effective index=1.46 for glass and
c=speed of light=$3 \cdot 10^8$ m/sec.

The resonance bandwidth $\Delta f$ is related to the number of taps N by the formula:

$$\Delta f = \frac{f}{N}$$

so that, $$\frac{\Delta L}{L} = \frac{\Delta f}{f} = \frac{1}{N}$$

For a given $\Delta L$, f and N are thus related by the formula:

$$f = \frac{c}{N n_g \Delta L}$$

A $\Delta L$ of at least 1 mm should be experimentally feasible so that 1 GHz operation with 81 taps should be achievable. For a $\Delta L$ on the order of 0.1 mm, operation up to 10 GHz would be achievable.

Figure 3:
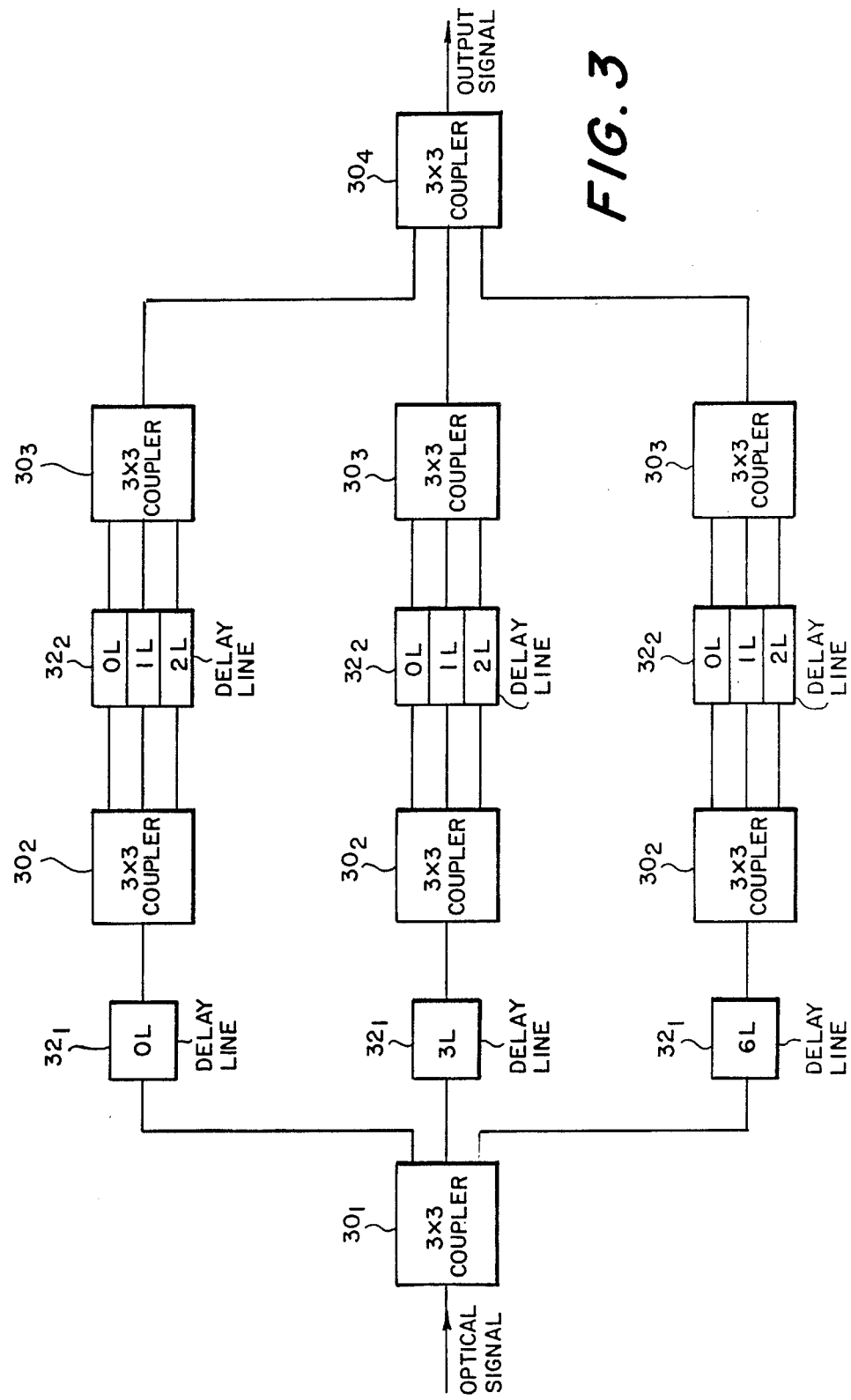
FIG. 3 is a schematic block diagram of a two-column optical transversal filter providing a single fiber optical output.

Referring to FIG. 3, an embodiment is illustrated wherein the optical output is provided on a single fiber. In this embodiment n=2, and couplers are denoted 30 and the delay lines (segments) are denoted 32. In general, the intended purpose is accomplished by reversing the n columns, without delays, as illustrated. In FIG. 3, which shows a nine tap device, the nine outputs of the delay line segments $32_2$ are coupled, without delay, through three couplers $30_3$ to an output coupler $30_4$ which provides an output signal in a single line (fiber). This technique involves higher loss because two-thirds of the input power (4.8 dB) is lost in each combining operation (i.e., in each column), but this approach is still advantageous because it allows the combined output to be incident on a single, high speed, small area detector.

Figure 4:
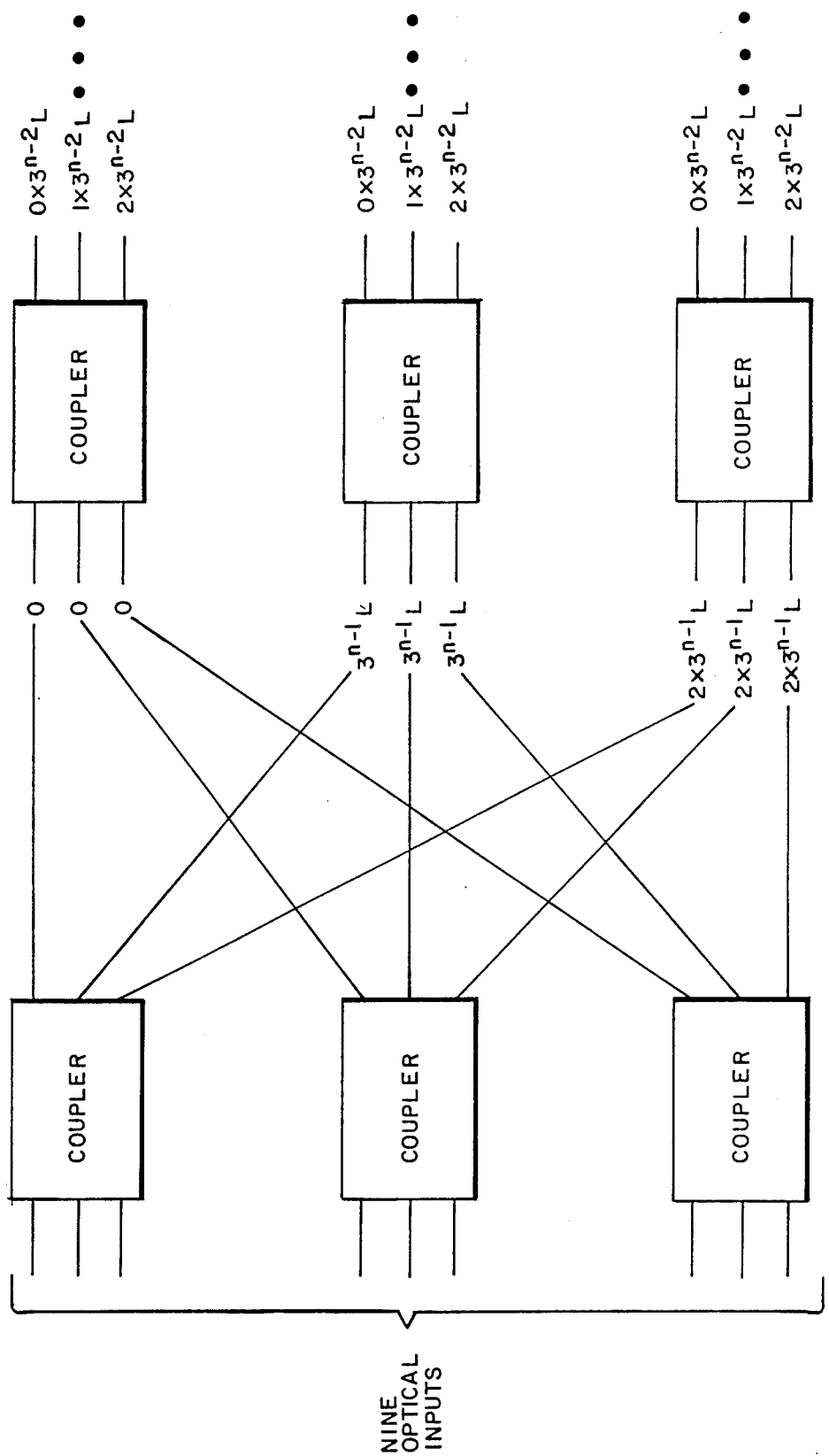
FIG. 4 is a partial schematic block diagram of an n-column transversal filter for receiving multiple inputs and utilizing a 9×9 star coupler.

Multiple inputs may be used with the same filter device and such an embodiment is illustrated in FIG. 4, wherein a 9×9 star input coupler configuration is used to accommodate nine input ports.

Figure 5:
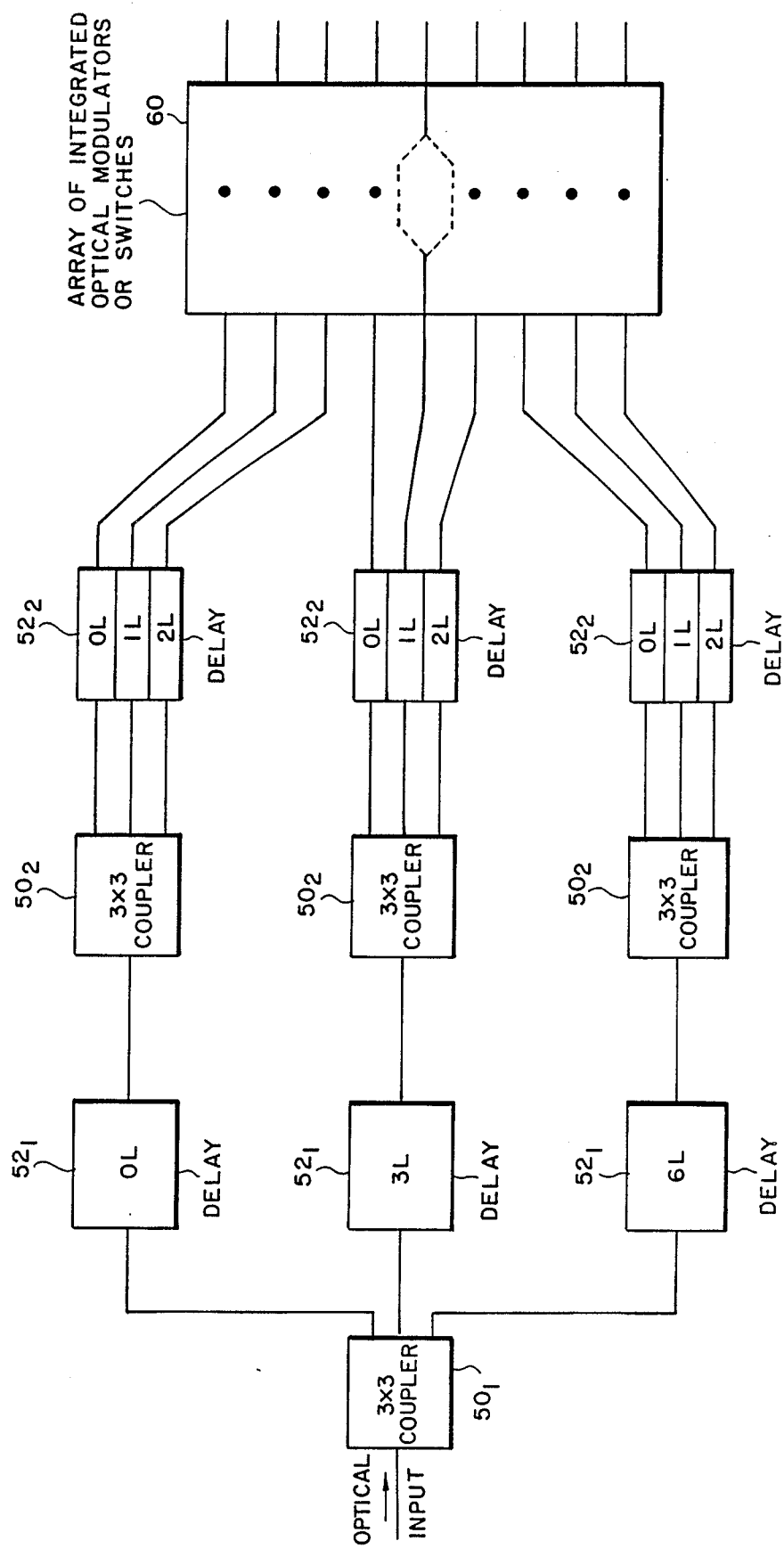
FIG. 5 is a block schematic diagram of transversal filter/variable delay line employing variable intensity control.

Variable weight output taps can be provided by connecting each output to an optical intensity modulator or switch. This embodiment of the invention is illustrated in FIG. 5 wherein an intensity modulator unit 60 is provided which is connected to the output of the nine taps of an optical filter device similar to that of FIG. 3 (n=2). Preferably, nine optical modulator or switches (not specifically illustrated) are integrated on LiNbO$_3$ substrates or backings so as to provide control of the intensities of the outputs of the taps, and in this regard, at least nine parallel connected devices can be placed on a single LiNbO$_3$ wafer. By varying the tap intensities, the filter transfer function can be shaped, and by permitting transmission at only one tap, an electrically controlled variable fiber delay line is thus provided.

It will be appreciated that a signal traversing any of the taps (channels) is split the same number of times (i.e., n times) and thus that each channel transmits the same power.

Although the present invention has been described relative to exemplary embodiments thereof, it will be understood by those skilled in the art that variations and modifications can be effected in these exemplary embodiments without departing from the scope and spirit of the invention.

What is claimed is:

1. An optical transversal filter comprising:
   input coupler means, comprising an optical power splitter, for receiving at least one optical input signal and providing a plurality of parallel outputs; further coupler means comprising a like plurality of said optical power splitters each providing a further plurality of outputs;
   intermediate fiber optic delay segments of at least two different lengths for coupling individual ones of said plurality of parallel outputs of said input coupler means to respective ones of said plurality of optical power splitters, and further fiber optic delay segments of at least two different lengths individually connected to the respective outputs of said plurality of optical power splitters such that different delays are provided at the outputs of said further fiber optic delay segments.

2. An optical transversal filter as claimed in claim 1 wherein said optical power splitters each comprise at least one 3×3 single mode optical coupler having three inputs and providing three outputs.

3. An optical transversal filter as claimed in claim 2 wherein said filter includes n columns of said coupler means, wherein there are only two different lengths for said fiber optic delay segments for each column, and wherein said fiber optic delay segments are connected to the outputs of the coupler means and interspersed with the columns of coupler means such that the fiber optic delay segments connected to the last column provide $3^n$ taps constituting the outputs of said further fiber optic delay segments, where n is the number of columns of said coupler means.

4. An optical transversal filter as claimed in claim 1 wherein the outputs of said further fiber optic delay segments are coupled through power combiner means to combine the optical outputs and the output of the filter comprises a single optical fiber which is connected to said power combiner means and which carries optical outputs combined thereby.

5. An optical transversal filter as claimed in claim 1 wherein said filter is adapted to receive multiple inputs, said input coupler means comprising an multiple input coupler device.

6. An optical transversal filter as claimed in claim 5 wherein said multiple input coupler device comprises a 9×9 star input device.

7. An optical transversal filter as claimed in claim 1 further comprising an optical intensity control means, connected to the output of at least one of said further optical fiber delay segments, for controlling the intensity of the optical signal at said output.

8. An optical transversal filter as claimed in claim 7 wherein said intensity control means comprises a optical modulator.

9. An optical transversal filter as claimed in claim 7 wherein said intensity control means comprises an optical switch.

10. An optical transversal filter as claimed in claim 7 wherein said intensity control means is connected to the outputs of all of said further optic fiber delay segments.

11. An optical transversal filter as claimed in claim 10 wherein said intensity control means comprises an optical modulator.

12. An optical transversal filter as claimed in claim 10 wherein said intensity control means comprises an optical switch.

13. An optical transversal filter as claimed in claim 1 wherein said fiber optic delay segments comprise single mode fibers.

14. An optical transversal filter as claimed in claim 1 wherein said fiber optic delay segments comprise multimode fibers.

* * * * *